United States Patent
Alexander et al.

(10) Patent No.: US 10,303,569 B2
(45) Date of Patent: May 28, 2019

(54) SIMPLIFIED PROCESSOR SPARING

(71) Applicant: International Business Machines Corporation, Armonk, NY (US)

(72) Inventors: Gregory W. Alexander, Pflugerville, TX (US); Brian D. Barrick, Pflugerville, TX (US); Shimon Ben-Yehuda, Haifa (IL); Ophir Erez, Haifa (IL); Anthony Saporito, Highland, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

(21) Appl. No.: 15/649,095

(22) Filed: Jul. 13, 2017

(65) Prior Publication Data
US 2019/0018744 A1 Jan. 17, 2019

(51) Int. Cl.
G06F 11/00 (2006.01)
G06F 11/20 (2006.01)

(52) U.S. Cl.
CPC ........ G06F 11/2028 (2013.01); G06F 11/203 (2013.01); *G06F 2201/805* (2013.01)

(58) Field of Classification Search
CPC . G06F 11/2028; G06F 11/203; G06F 11/2033
See application file for complete search history.

(56) References Cited

U.S. PATENT DOCUMENTS

| 6,189,112 B1 | 2/2001 | Slegel et al. |
|---|---|---|
| 7,111,196 B2 | 9/2006 | Balazich et al. |
| 8,443,163 B1 | 5/2013 | Bailey et al. |
| 8,683,180 B2 | 3/2014 | Barrick et al. |
| 8,886,909 B1 | 11/2014 | De Forest et al. |
| 8,924,681 B1 | 12/2014 | Throop et al. |
| 2004/0221193 A1 | 11/2004 | Armstrong et al. |
| 2004/0230865 A1* | 11/2004 | Balazich ............. G06F 11/2028 714/13 |
| 2008/0163255 A1 | 7/2008 | Munoz et al. |
| 2014/0025991 A1* | 1/2014 | Anandavally ....... G06F 11/0793 714/10 |
| 2014/0089732 A1 | 3/2014 | Busaba et al. |

(Continued)

FOREIGN PATENT DOCUMENTS

WO 2013101193 A1 7/2013

OTHER PUBLICATIONS

Nakka, et al.; "Recent Advances in Industry and Experimental Research in Processor Level Error Detection and Recovery"; Center for Reliable and High Performance Computing Coordinated Science Laboratory; University of Illinois; 2006; pp. 1-26.

(Continued)

*Primary Examiner* — Michael Maskulinski
(74) *Attorney, Agent, or Firm* — Cantor Colburn LLP; William Kinnaman

(57) ABSTRACT

In a multi-core computer system, a method for dealing with a fault with a core includes detecting a fault in one of the cores. Information is transferred from a recovery buffer to a mapper. The information includes logical register mapping information. A recovery is performed using the information in the mapper. If a recovery cannot proceed, a sparing can be initiated using the information in the mapper.

19 Claims, 3 Drawing Sheets

(56) References Cited

U.S. PATENT DOCUMENTS

2014/0089734 A1* 3/2014 Busaba ............... G06F 11/0715
 714/16
2016/0139831 A1 5/2016 Bronson et al.
2018/0181474 A1* 6/2018 DeHaemer .......... G06F 11/2028

OTHER PUBLICATIONS

Zhang et al.; "Dynamic Cache Pooling in 3D Multicore Processors"; ACM Journal on Emerging Technologies in Computing Systems, vol. 12, No. 2, Article 14; Boston University; Aug. 2015; 21 pages.

* cited by examiner

SIMPLIFIED PROCESSOR SPARING

BACKGROUND

The present invention generally relates to computer architecture, and more specifically, to simplified sparing and recovery options for processors or cores in multi-core systems.

Computer system manufacturers and computer processor manufacturers continually strive to produce faster and more reliable computer systems. One way that computer systems are made faster and more reliable is to provide a multi-processing computer system. A multi-processing computer system can be implemented using multiple single-core processors or one or more multi-core processors. A multiprocessing computer system can be faster than a single processor system because the multiple processor cores can be made to execute tasks in parallel with one another. A multi-processing computer system can be made more reliable because, in the event of a failure of one processor or core, another processor or core can take over the functions that were being executed on the failed processor or core at the time of the failure. The capability to move an architectural state from one processor core of a multiprocessor computer system to another processor core can be referred to as processor sparing. In the existing art, sparing has been a complex process because the architectural state of the processor may be spread across multiple locations, including a mapper and a recovery buffer. In these cases, the sparing process must access both the mapper and the recovery buffer and process that information.

In addition to sparing is the related concept of recovery. While sparing involves replacing a processor core with a spare processor core, recovery involves stopping a processor core from executing, then restoring the processor from a known state, thus preserving the architecture. This recovery process includes moving information from a recovery buffer into a mapper and then performing a recovery reset that resets all non-architectural state to a known good reset state. There can be issues when mixing recovery with sparing.

SUMMARY

Embodiments of the present invention are directed to a method for dealing with a faulty core in a multi-core computer system. A non-limiting example of the method includes detecting a fault in one of the cores. Information is transferred from a recovery buffer to a mapper. The information includes logical register mapping information. A sparing is performed using the information in the mapper.

Embodiments of the present invention are directed to a computer system with multiple computing cores. The system is arranged to detect a fault in one of the cores. Information is transferred from a recovery buffer to a mapper. The information includes logical register mapping information. A sparing is performed using the information in the mapper.

Embodiments of the invention are directed to a method for dealing with a faulty core in a multi-core computer system. A non-limiting example of the method includes detecting a fault in one of the cores. Information is transferred from a recovery buffer to a mapper. The information includes logical register mapping information. A sparing is performed using the information in the mapper. The sparing includes loading a mapping of logical registers to physical registers from the mapper. The sparing also includes restoring operation of the core at a point in time prior to the detection of the fault.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
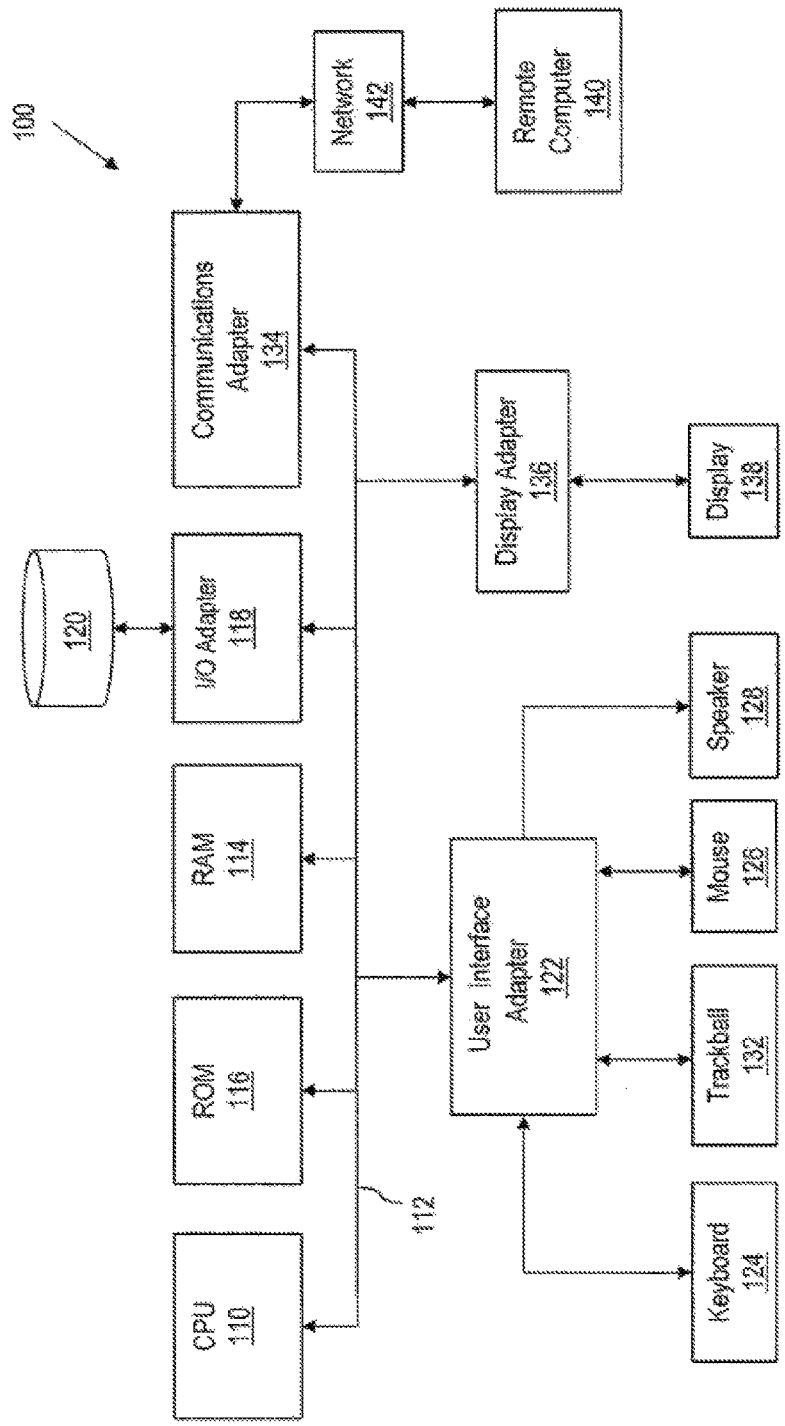
FIG. 1 is a block diagram illustrating a data processing system capable of performing one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well-known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in multi-processing computer systems, processor-sparing functionality is invoked when a non-recoverable error occurs on a processor core. In such a case, the system transfers the last good architected state of the processor core to another processor core, which resumes execution of the programs formerly handled by the failed processor core. The processor-sparing functionality typically involves logic, low-level firmware (sometimes referred to as millicode) and high-level firmware. The low-level firmware comprises firmware that supports processor operations and is typically not exposed to end users of the processor. High-level firmware may be seen by end users and may include a hypervisor (i.e., a virtual machine manager), input/output functions and other support functions.

With reference now to the figures, and in particular to FIG. 1, an example is shown of a data processing system 100 which includes multiple processor cores. As shown in FIG. 1, data processing system 100 has a central processing unit (CPU) 110, which may be implemented with two or more cores 200 of FIG. 2. It should be understood that CPU 110 includes multiple cores of a single processor and/or multiple central processing units, each with one or more cores. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114, I/O adapter 118, and communications adapter 134 are also coupled to the system bus 112. RAM 114 can also be referred to as main memory. I/O adapter 118 may be a small computer system interface ("SCSI") adapter that communicates with a storage device 120. Any other type of I/O adapter can be used (e.g., SATA, Fibre Channel, Ethernet, and the like). Storage device 120 can include any number of mass storage devices, such as hard disk drives, solid state drives, optical disc drives, tape drives, and the like. Communications adapter 134 interfaces interconnect 112 with network 142, which enables data processing system 100 to communicate with other such systems, such as remote computer 140. Input/output devices are also connected to interconnect 112 via user interface adapter 122 and display adapter 136. Exemplary input/output devices can include keyboard 124, track ball 132, mouse 126 and speaker 128, each of which are interconnected to bus 112 via user interface adapter 122. Display 138 is connected to system bus 112 by display adapter 136. In this manner, data processing system 100 receives input, for example, throughout keyboard 124, trackball 132, and/or mouse 126 and provides output, for example, via network 142, on storage device 120, speaker 128 and/or display 138. The hardware elements depicted in data processing system 100 are not intended to be exhaustive, but rather represent principal components of a data processing system in some embodiments.

Figure 2:
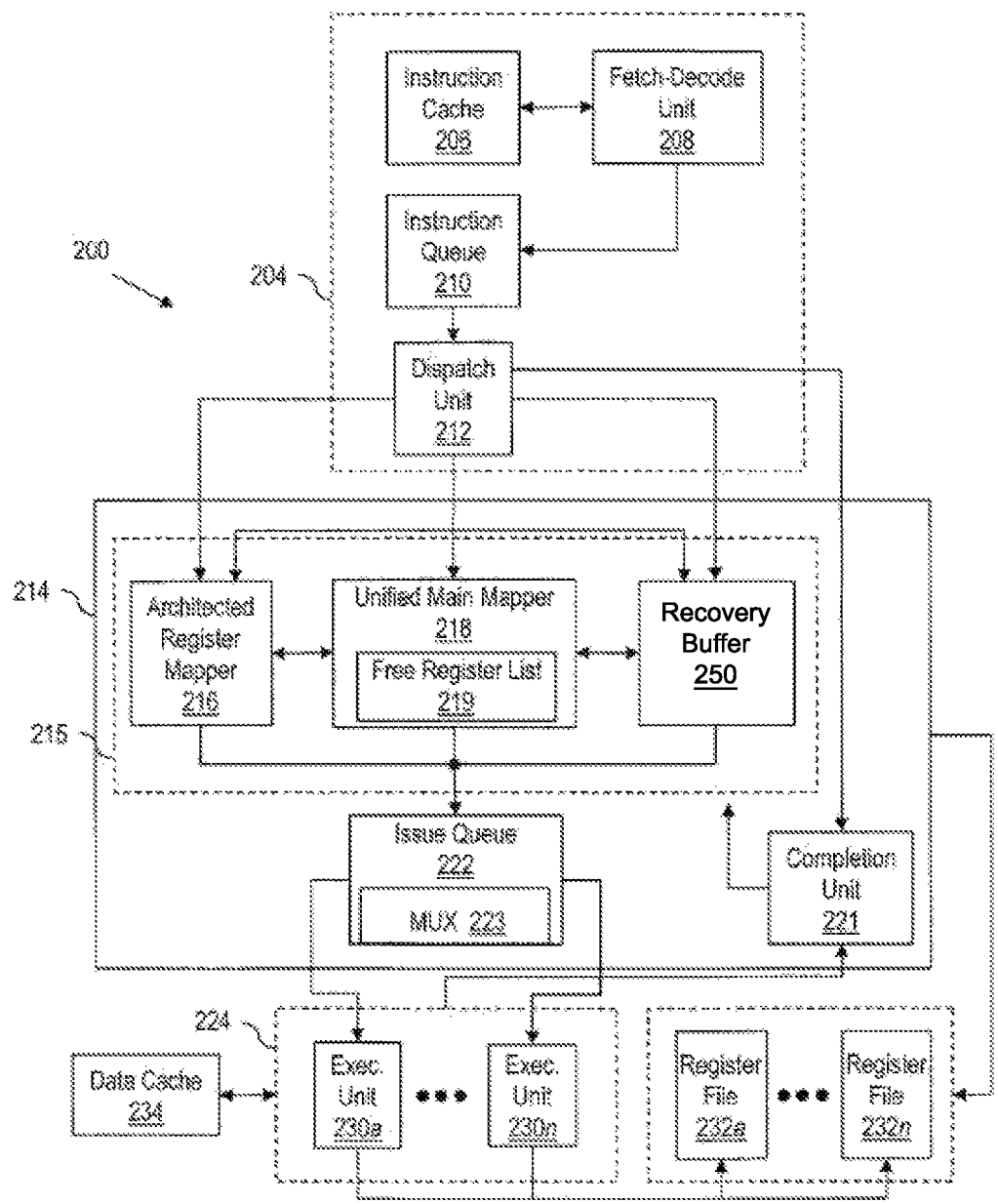
FIG. 2 is a block diagram illustrating the internal construction of a processor core capable of performing one or more embodiments.

Referring now to FIG. 2, there is depicted a processor core 200 according to the principles of the present invention. Instructions are retrieved from memory (e.g., RAM 114 of FIG. 1) and loaded into instruction sequencing logic (ISL) 204, which includes Level 1 Instruction cache (L1 I-cache) 206, fetch-decode unit 208, instruction queue 210 and dispatch unit 212. Specifically, the instructions are loaded in L1 I-cache 206 of ISL 204. The instructions are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 221. Completion unit 221 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, such as floating-point (FP), fixed-point (FX), and load/store (LS). General execution engine 224 exchanges data with data memory (e.g. RAM 114, ROM 116 of FIG. 1) via a data cache 234. Moreover, issue queue 222 may contain instructions of FP type, FX type, and LS instructions. However, it should be appreciated that the invention is not limited in this regard, and any number and types of instructions can be used. During execution, EUs 230a-230n obtain the source operand values from physical locations in register file 232a-232n and store result data, if any, in register files 232a-232n and/or data cache 234.

Still referring to FIG. 2, register management unit 214 includes: (i) mapper cluster 215, which includes architected register mapper 216, unified main mapper 218, recovery buffer 250, and (ii) issue queue 222. Mapper cluster 215 tracks the physical registers assigned to the logical registers of various instructions. Architected register mapper 216 includes a pointer list that identifies a physical register which describes the completed state. Physical register files 232a-232n will typically contain more registers than the number of entries in architected register mapper 216. It should be noted that the number of physical and logical registers that are used in a renaming mapping scheme can vary and the invention is not limited in this regard.

In a multiple core system, there can be several mechanisms to deal with errors to a core. Most important are the processes of recovery and sparing. In recovery, after an error is detected in a core, the core is restored to a previously known state. The core then continues processing from that previously known state. This can be effective for transient hardware errors, such as a stray external signal that temporarily caused a transistor to latch to a wrong value. More serious errors can include systematic errors that occur over and over again that could be due to hardware faults. Recovery cannot help such a core because every time the core is brought back to a previous state, the core encounters the same error again.

In a multiple core system, such errors can be overcome using a technique called sparing. For sparing, when one core of a multiple core system fails, the workload of that core is dynamically moved from the defective core to a spare, healthy core. The spare core could be active or dormant. The end result is that software that is executing on the multiple-core system need not be even made aware of the problem because processing is simply taken over by a spare core.

Issues can occur when sparing is attempted near a completion that did not checkpoint. With continued reference to FIG. 2, an issue that could occur in the past is as follows. After complete unit 221 indicates instruction complete, the state of the core prior to completion is stored in recovery buffer 250. Thereafter, new data regarding the completed state of the core is stored in architected mapper 216. After the instruction is checkpointed, recovery buffer 250 is purged of state prior to that instruction. The issue is that an error may be detected after completion unit 221 indicates completion, but before a checkpoint occurs. If this occurs, then the correct status of the core prior to checkpoint is split between architected mapper 216 and recovery buffer 250. If a sparing is attempted at this point, a sparing routine would have to read both the architected mapper 216 and recovery buffer 250 to determine the correct state for the spare core to return to. An attempt to spare would read the architected mapper 216, then backtrack through the recovery buffer 250 to determine the state of the core before the error condition occurs. This procedure is not easy to implement and can result in a failure to spare. The failure to dynamically spare the core can result in a core being taken out of active use with no other core being used to replace it, resulting in a software-visible error condition or system checkstop.

Turning now to an overview of the aspects of the invention, one or more embodiments of the invention address the above-described shortcomings of the prior art by providing simpler and more reliable techniques to handle core failures. One or more embodiments restore the recovery buffer data to the architected mapper before deciding whether to perform a recovery operation or a sparing operation. In essence, a "mini-recovery" is performed prior to sparing.

The above-described aspects of the invention address the shortcomings of the prior art by having the previous state of the core restored to the architected mapper from the recovery buffer. From this point, either a recovery operation or a sparing operation can be performed quickly and reliably.

Figure 3:
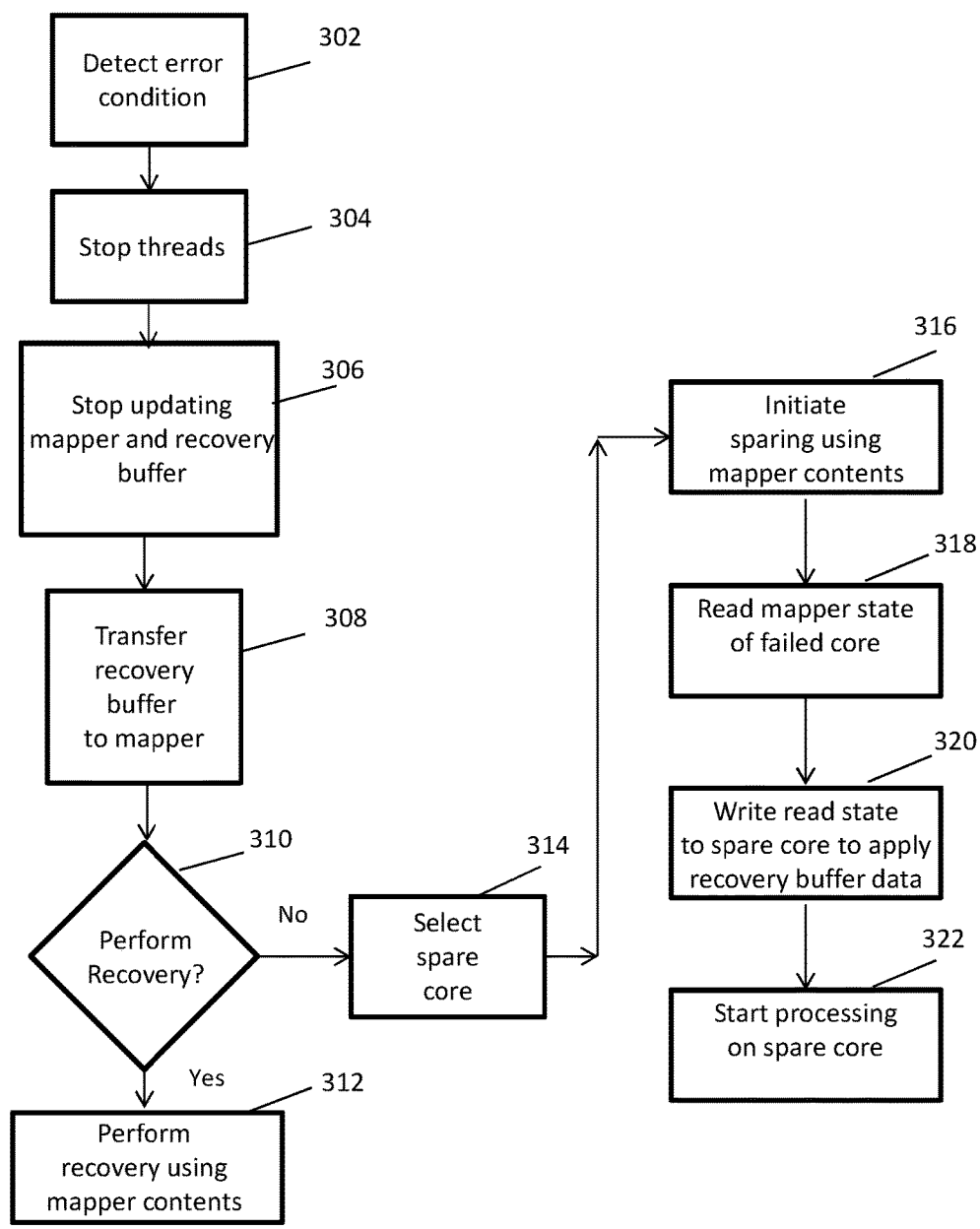
FIG. 3 is a flowchart illustrating a method for dealing with core faults in accordance with one or more embodiments.

Turning now to a more detailed description of aspects of the present invention, FIG. 3 depicts a flowchart illustrating a method 300 according to embodiments of the invention. Method 300 is merely exemplary and is not necessarily limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined or skipped. In some embodiments, portions of method 300 can be implemented by system 100 (FIG. 1).

In a system with multiple processing cores, an error condition is detected in a core (block 302). At this point, it might not be clear whether the error condition is a less serious condition that can be solved via a recovery of the core or a more serious condition that is better solved by sparing (replacing the processing core with a spare processing core). The detection can occur in one of a variety of different manners, now known or developed in the future. In some embodiments, an error condition is detected by error detection circuits within a processor core which could include but are not limited to parity checking circuits, error correction code checking circuits, or invalid state detection circuits.

All threads in the processing core that has the error condition are stopped (block 304). Updates to the architected mapper 216 and recovery buffer 250 are also stopped (block 306). Because all threads in the processing core are stopped, the processor is able to transfer the contents of recovery buffer 250 to architected mapper 216 (block 308). Transferring the contents of recovery buffer 250 to architected mapper 216 can take place in one of a variety of different manners. As described above, during normal processing, information is transferred from architected mapper 216 to recovery buffer 250 after completion, but before a checkpoint has been reached.

If a recovery will be performed (block 310), then the core experiencing errors is restored to its previous state by using the information in the architected mapper 216 (block 312). A recovery reset is performed to reset the non-architected state of the machine to a known-good reset state. Recovery is the overall process of resetting the processor to a previous architected state and includes both the recovery buffer information transfer (recovery buffer restore) and the recovery reset. Recovery reset is the process of restoring the non-architectural state of the machine to a known-good (reset) state and then restarting the machine from that state. The recovery process can be performed in one of a variety of different manners. A recovery state machine can be used to track the recovery of a core. The recovery is intended to restore the core to the last checkpointed state and is tracked in the recovery state machine.

In some instances, a problem cannot be alleviated through a recovery process. This can be discovered in one of a variety of different manners. For example, repeated attempts at recovery may have been initiated, yet failed. In another example, an invalid state check may have found an invalid state that cannot be corrected by recovery reset.

In those cases and other cases that may exist, a sparing is performed. Since the information in recovery buffer 250 was already placed into the architected mapper 216, a sparing can be initiated using the information in architected mapper 216. In the sparing process, a spare core is selected (block 314). As discussed above, in multiple core system, there can be one or more cores set aside for use as spares. For example, for every 10 cores in a system, one of the cores could be set aside for use as a spare. In some embodiments, a data processing system can have dozens, hundreds, or even more central processing units, each with multiple cores. After the spare core is selected, the information in architected mapper 216 is used to initiate a sparing process (block 316). The sparing process is intended to bring the spare core on-line in a known good condition of the now failed core. The mapper state of the failed core is read (block 318). This mapper state is written to the spare core to apply the architected state of the failed core to the spare core (block 320). At this point, processing can begin on the spare core (block 322). In some embodiments, this sparing process can be seamless, such that software executing on the multiple core system need not even be aware that the software is executing on a different core. Once a core (either the recovered core or a spare core) is operating in the correct state, operation of the data processing system can resume.

Some errors may not be corrected by either recovery or sparing. In some embodiments, if recovery buffer 250 is not restored within a certain amount of time, the recovery state machine can note the failure of the recovery and indicate that an uncorrectable error exists.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   detecting a fault in a first core in a multi-core computer system;
   based at least in part on the detecting, transferring information from a recovery buffer to a mapper, wherein the information includes logical register mapping information;
   after transferring the information from the recovery buffer to the mapper, determining if a recovery reset will proceed;
   upon determining that the recovery reset will not proceed, selecting a spare core; and
   performing a sparing using the information in the mapper.

2. The method of claim 1 wherein performing the sparing comprises:
   loading the information in the mapper to the spare core; and
   logically replacing the first core with the spare core.

3. The method of claim 1 wherein determining that the recovery reset cannot proceed comprises detecting a previous recovery reset attempt failed.

4. The method of claim 1 wherein determining that the recovery reset cannot proceed comprises detecting a failure to restore the recovery buffer.

5. The method of claim 1 further comprising stopping execution of threads in the first core.

6. The method of claim 5 further comprising stopping any updates to the mapper and the recovery buffer.

7. The method of claim 1 further comprising:
   upon determining that recovery reset will proceed, performing a recovery of the first core using the information in the mapper.

8. A system comprising:
   a plurality of processing cores; wherein:
   the system is arranged to:
      detect a fault in a first core;
      after transferring information from a recovery buffer to a mapper, determining if a recovery reset will proceed, wherein the information includes logical register mapping information;
      upon determining that the recovery reset will not proceed, selecting a spare core; and
      performing a sparing using the information in the mapper.

9. The system of claim 8 wherein performing the sparing comprises:
   loading the information in the mapper to the spare core; and
   logically replacing the first core with the spare core.

10. The system of claim 8 wherein determining that the recovery cannot proceed comprises detecting a previous recovery attempt failed.

11. The system of claim 8 wherein determining that the recovery cannot proceed comprises detecting a failure to restore the recovery buffer.

12. The system of claim 8 wherein the system is further arranged to stop execution of threads in the first core.

13. The system of claim 12 wherein the system is further arranged to:
   stop any updates to the mapper and the recovery buffer.

14. The system of claim 8 further comprising:

upon determining that recovery reset will proceed, performing a recovery of the first core using the information in the mapper.

15. A method comprising:

detecting a fault in a first core in a multi-core computer system;

based at least in part on the detecting, transferring information from a recovery buffer to a mapper, wherein the information includes logical register mapping information; and upon determining that a recovery reset cannot proceed, selecting a spare core;

performing a sparing using the information in the mapper; wherein performing the sparing comprises:

loading the information in the mapper to the spare core; and logically replacing the first core with the spare core.

16. The method of claim 15 wherein determining that the recovery cannot proceed comprises detecting a previous recovery attempt failed.

17. The method of claim 15 wherein:

information in the recovery buffer comprises information about a state of the first core after a completion step has been performed on the first core and before a checkpoint has been performed on the first core.

18. The method of claim 15 further comprising stopping execution of threads in the first core.

19. The method of claim 15 further comprising:

upon determining that the recovery reset can proceed:

performing a recovery reset of the first core using the information in the mapper, wherein performing the recovery reset comprises:

loading a mapping of logical registers to physical registers from the mapper; and restoring operation of the first core at a reset state of the first core.

\* \* \* \* \*